United States Patent Office 3,314,980
Patented Apr. 18, 1967

3,314,980
COMPLEX ALKYLENE-BRIDGED DI(SILICON, GERMANIUM, TIN AND LEAD) POLYMERS AND THEIR PREPARATION
Bernard Rudner, Pittsburgh, Pa., and Mead S. Moores, Wilmington, Del., assignors to Koppers Company, Inc., a corporation of Delaware
No Drawing. Filed Oct. 24, 1963, Ser. No. 318,506
12 Claims. (Cl. 260—429)

This invention relates to the preparation of organometallic compounds and is a continuation-in-part of our copending application Ser. No. 186,308, filed Apr. 10, 1962, now abandoned. In one specific aspect, it relates to a new method of making organometallic compounds by direct reaction of an unsaturated hydrocarbon with a halometallic compound in the presence of aluminum and hydrogen.

Recently, organometallic compounds have been attracting widespread attention because of their numerous industrial uses. Organohalosilanes are useful as water-repellents for concrete and as agents for bonding resins to glass fibers. They are also used as intermediates in the preparation of lubricants. Organotin compounds are used as stabilizers for polyvinyl chloride, imparting properties of extreme clarity, high quality, and high processing temperatures. They also have biocidal and fungicidal properties, making them useful for emulsion paints and agricultural purposes. In addition, they have catalytic properties useful in making polyurethanes, polyolefins and silicones. Organolead compounds are well known as fuel additives.

Heretofore organometallic compounds of silicon, germanium, tin and lead were prepared by the well-known Grignard reaction:

$$MCl_m + RMgCl \rightarrow RMCl_{m-1} + MgCl_2$$

Another known method is the reaction between metal halides and organoaluminum compounds $$MCl_m + R_3Al \rightarrow R_mM + AlCl_3$$

The latter method, however, is not very practical for commercial purposes since it involves the use of the expensive and dangerous aluminum alkyls. It is also a complex and inflexible operation. Thus to make, for example, a tri(2-ethylhexyl)chlorosilane, one must first make tri(2-ethylhexyl)aluminum via either the tedious sesquinchloride route or the less efficient displacement of isobutyl groups by the relatively unavailable 2-ethylhexene, then react this with silicon tetrachloride to get predominantly the tetra-(2-ethylhexyl)silane and then inefficiently disproportionating this with more silicon tetrachloride to get a mixture containing the desired tri(2-ethylhexyl)chlorosilane.

Quite surprisingly, we have developed a method of making organometallic compounds by reacting directly a metallic halide, wherein the metal is selected from Group IVA of the Periodic Table, having an atomic number of 14–82 and an unsaturated hydrocarbon in the presence of aluminum and hydrogen, as illustrated most simply by the equation:

$$MX_4 + npC_2H_4 + \tfrac{1}{3}pAl + \tfrac{1}{2}pH_2 \rightarrow$$
$$[H(C_2H_4)_n]_pMX_{4-p} + \tfrac{1}{3}pAlX_3$$

wherein the terms M, X, n and p are defined below. This is a simple, one-step reaction which may be performed either in a static or a dynamic system.

It is an object of the invention to provide a new method of making organometallic compounds.

Another object of the invention is to prepare polymeric organometallic compounds.

In accordance with our invention, we have developed a method of making a mxiture of monomeric and polymeric organometallic compounds. The monomeric compounds have the formula:

$$R_rR'_{p-1}MX_{5-(r+p)}$$

wherein R is alkyl having from 2–12 carbon atoms, R' can be R, phenyl and hydrogen, M is a metal selected from Group IVA of the Periodic Table having an atomic number of 14–82 inclusive, X is a halogen, r is an integer having a value of 1–3, p is an integer having a value of 1–2, and the values of r and p being such that their sum is equal to 2–5. The polymeric compounds have the formula:

$$\left[ -(C_nH_{2n})_z-\overset{R'_{4-(y+z)}}{\underset{|}{M}}-(C_nH_{2n})_y-\overset{R'_{4-(y+z)}}{\underset{|}{M}}- \right]_x$$

wherein R' and M are as defined above; n is an integer having a value of 2 and 4; x is an integer having a value of 2–10, y is an integer having a value of 2–3, z is an integer having a value of 1–2, such that the sum of y plus z is not greater than four. The method comprises reacting, under anhydrous, oxygen-free conditions, a compound of the formula $R'_{p-1}MX_{m+1-p}$ wherein R', M, x and p are defined as above and m is the valence of said metal, with a sterically unhindered unsaturated hydrocarbon having from 2–12 carbon atoms, metallic aluminum, and hydrogen at a temperature of 150–450° C. By sterically unhindered unsaturated hydrocarbon is meant an olefin in which each of the carbon atoms that carry a non-aromatic double bond has at least one hydrogen atom attached to it.

REACTANTS

Metallic compounds useful in our reaction have the general formula $R'_{p-1}MX_{m+1-p}$, wherein R' is selected from the group consisting of phenyl, lower alkyl, and hydrogen, M is a metal having an atomic number of 14–82, inclusive, selected from Group IVA of the Periodic Table, X is a halogen, m is the valence of the metal, and p is an integer having a value of 1–2. The Group IVA metals include silicon, germanium, tin and lead. Best results are obtained from the metal halides, since these are stable and commercial items. When the metal has more than one valence (e.g. $SnCl_2$, $SnCl_4$ and $GeF_2$, $GeF_4$), better results are obtained when using compounds having the lower valence. Halogens include chlorine, bromine, iodine, and fluorine. Unexpectedly, reactivity for our purposes does not always parallel ease of reduction (which is iodide>bromide>chloride»fluoride). Thus for silicon compounds, the order of decreasing suitability in our reaction is chloride>bromide=fluoride>iodide, whereas for tin and lead compounds the order of decreasing suitability is fluoride>chloride»bromide»iodide. To a limited extent, up to about 25 percent, the organometallic halide, halometallic hydride or metallic halide may be replaced by the corresponding oxide, alkoxide or acetate, whereby the extent of alkylation, that is "r" is the general non-polymer formula, would be correspondingly limited.

Particularly useful compounds of silicon are: silicon tetrabromide, trichlorosilane, silicon tetrafluoride, silicon tetraiodide, ethyldichlorosilane, phenyltrichlorosilane, methyltrichlorosilane, and diphenyldibromosilane; of germanium are: germanium dibromide, germanium tetrabromide, germanium dichloride, germanium tetrachloride, germanium diiodide, germanium tetraiodide, germanium difluoride, germanium tetrafluoride, methyltrichlorogermane, dimethyldibromogermane, and phenyltrifluorogermane; of tin are: stannous bromide, stannic bromide, stannous iodide, stannous fluoride, stannic fluoride, stannous chloride, stannic chloride, tin tribromochloride, propyltrichlorostannane and dibenzytin dichloride; of lead are: lead bromide, lead chlorides, lead fluoride, lead monoiodide, lead diiodide and diethyllead dichloride.

Useful organic compounds are unsaturated hydrocarbons, both cyclic and acyclic, in which the non-aromatic unsaturation required for our invention is sterically unhindered, i.e., each of carbon atoms carrying fixed double or triple bonds also carries at least one hydrogen atom. These hydrocarbons have from 2–9 carbon atoms and include ethylene, propylene, butylene, styrene, 4-methylcyclohexene, 4-methylstyrene, etc. Another useful group includes hydrocarbons containing more than one unsaturation, such as acetylene, methyl allene, butadiene, 3-vinyl-cyclohexene, cyclopentadiene, etc. Obviously some of these, although sterically unhindered, do not have

residues. Some functionally substituted olefins are also useful, e.g. acrylonitriles; however, haloolefins do not work. It has also been shown possible, but not often advantageous, to use "nascent" olefins, i.e., those simple compounds such as cycloalkanes, branched alkanes, and haloalkanes that, under the conditions of our reaction are converted, albeit momentarily, to the sterically unhindered unsaturated hydrocarbons as defined above.

The aluminum used, in powdered or leaf form, must be clean and dry. Prior to or even during the reaction, the aluminum is preferably activated by treatment with activating agents. These activators, which serve largely to present clean, and therefore "wettable," aluminum surfaces to the other reactants, are beneficial chiefly in cutting down or eliminating induction periods. The activation of aluminum has been well described in U.S. Patents 2,892,738 and 2,908,562 and 2,921,876. It appears at the present time that the reaction is specific to aluminum insofar as attempts to obtain equivalents, such as sodium and magnesium, were unsuccessful.

Hydrogen consumed in the reaction must be anhydrous and oxygen-free.

NATURE OF PRODUCTS

Our novel reaction is unique in that it affords controllably variable amounts of two different types of products, the simple alkylated "metallane" such as tributylchlorostannane and triethylbutylsilane, and the novel complex bridged alkylenedimetallane polymers exemplified by the specific structure:

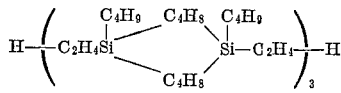

Within each type a wide range of individual species is obtainable. Thus, the simple alkylsilanes obtained on reaction of ethylene, aluminum, silicon tetrachloride and hydrogen include triethylsilane, triethylchlorosilane, tetraethylsilane (often the major component of the non-polymers), triethylbutylsilane, and ethylbutylhexylchlorosilane. The formation of higher alkyl groups, e.g., octyl, from ethylene, is occasionally accompanied by unsaturation. The polymeric products are even more complex mixtures, because they include both doubly-bridged silicon atoms, e.g.,

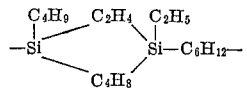

and triply-bridged silicon atoms, e.g.,

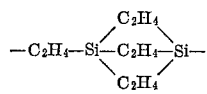

In addition, depending on reaction conditions, the polymers will contain metal-bonded chlorine, and metal-bonded hydrogen in varying amounts (up to about ten percent of the silicon atoms, for example) and very minor amounts of carbon-bound chlorine. There is also occasionally some unsaturation, but rarely enough to make the products sensitive to air-oxidation. The degree of polymerization ($x$ in the general formula) is somewhat less variable, ranging from two to about ten, as an average value. The weight ratio of one product type to the other is determined, like the composition within the type, both by the nature of the reactants and by the reaction conditions. It was found possible, with very little process study, to vary the composition from about 100 percent of the simpler type to about 80 percent of the polymeric type; continued experiments indicate the limits may be 100 and 95 percent. Gross separation of the two types can be readily effected by vacuum distillation. In addition, the novel polymers are far less soluble in e.g., methanol, than the non-polymers, and therefore can be separated by extraction.

REACTION CONDITIONS

The reaction can be run either as a static batch process, as in Example I, or in a dynamic flow system, as in Example XXI. In general, the batch process gives a higher yield of polymeric products and a higher one-pass conversion of reactants, and at lower temperatures and pressures, than are required by or obtainable from, the flow reactors. The flow system gives useful conversions only at elevated pressures; atmospheric pressure reaction in a tube system is inefficient. Batch pressures are usually, but not necessarily autogeneous, and are largely a function of the reaction temperature employed. Batch pressures of 500–1500 pounds are common, while flow pressures of approximately 100 atmospheres are desirable for efficient operation.

In the batch runs, the reactions have been self-sustaining but not self-starting, at about 130° C. They can normally be run in the range 130–350° C. with a preferred operating range of 200–300°. In the flow system, a temperature range 250–450° is more representative.

The reactant ratios very largely determine the gross nature of the product. As an example, the higher the $C_2H_4$:$H_2$, $C_2H_4$:Al, and $C_2H_4$:$SiCl_4$ molar ratios, the greater is both the degree of alkylation ($R_4Si$ being more highly alkylated than $R_3SiCl$) and the average number of carbon atoms in each R group. A high Al:$SiCl_4$ ratio, particularly when combined with high $C_2H_4$:$H_2$ and $C_2H_4$:$SiCl_4$, results in a loss of ethylene by the formation of aluminum alkyls, but only after the silicon tetrachloride has been consumed. Depending upon the type of product most desired, we have found the following ranges of molar ratios to be useful:

| | Moles |
|---|---|
| Aluminum | [1] 0.2–10 |
| Hydrogen | [1] 1–100 |
| Olefin | [1] 1–100 |

[1] Per mole of metallic halide.

In addition the type of apparatus will affect the molar ratios required, since, if it is desired to make, e.g., $Bu_nSiCl_{4-n}$ in a flow system, then high $C_2H_4$:$SiCl_4$, $C_2H_4$:Al, and $SiCl_4$:Al ratios will be needed. Again, if X is fluoride, increased $H_2$:$MX_m$ and Al:$MX_m$ ratios will be necessary. But if $MX_m$ is, for example, $PbBr_2$, the known great ease of reduction of this halide makes it necessary to use low $H_2$:$MX_m$ and Al:$MX_m$ ratios.

In the batch process, use of "inert" solvents may occasionally be advantageous, preferably a solvent more volatile than any of the products. Where polymers are the desired products, it is advantageous to use the distillation foreruns, comprising the simple non-polymeric alkylmetallane products, as solvents in successive runs. When this cannot be done, the solvents of choice are the relatively unreactive hydrocarbons e.g., Decalin, bicyclohexyl, tridecane, and mineral oil, and the stable halogen compounds, such as trichlorobenzene. Occasionally, the olefin used as reactant is also useful as the solvent. In the flow reactor, use of a solvent is generally undesirable.

In order to minimize or eliminate any reaction induction period, it is advantageous to activate the aluminum by adding, to the kettle, catalytic quantities of chemicals known to be useful for that purpose, e.g., halogens, sodium, zinc, mercuric, or chromium chlorides, alkylaluminum compounds, etc. Another type of additive, one that converts aluminum chloride or bromide (when they are reaction products) to an insoluble, readily filterable solid, is occasionally useful. For this purpose anhydrous sodium chloride is the additive of choice, although lithium chloride and the alkali and alkaline earth fluorides are also useful. As shown in Example XXVI below, however, the complexing step is not necessary.

The reaction must be run under anyhydrous, oxygen free conditions and in the absence of hydrogen halides or other active H compounds.

PRODUCT RECOVERY

The desired product, a mixture of homologous organometallic compounds, is recovered from the reaction under conditions which vary somewhat for the type of system used. In the static system, the reactor is cooled to room temperature and then vented to permit the escape of gases, such as unconsumed olefins, hydrogen and other very volatile products. These gases are recovered in a trap or similar device and quantitatively determined. The reactor is then charged, if necessary, with a complexing agent and heated to a temperature of 100–200° C. under constant stirring for a period of about two hours to "fix" the volatile aluminum halides. After cooling, the solid material, composed essentially of aluminum complex and metallic aluminum, is removed by filtration. Low boiling solvents are removed by stripping and then the desired products are fractionated. The temperature and pressures of the final distillation will depend largely on the products desired. These conditions necessarily will also vary with the metallic group, size of alkyl radicals, and the number of carbon chains. It is therefore, necessary that particular conditions be empirically determined. In the flow system, product recovery is similar but requires a few modifications. After the products are prepared, they must first be cooled to effect condensation. No venting of volatile gases is required. The condensed products are then reacted with a complexing agent and the precipitate, composed chiefly of aluminum complex, is removed by filtration. Removal of solvents and product separation is the same as for the flow system.

Our invention is further illustrated by the following examples:

*Example I*

A one-gallon stirred stainless steel autoclave was cleaned, dried and flushed free of air with nitrogen and then charged anaerobically with 750 ml. pure cyclohexane, 72 g. clean dry aluminum powder (commercially available as Aloca 322), and 0.2 mole triethylaluminum. The autoclave was stirred and heated to 200° C. for 30 minutes under a nitrogen atmosphere, and cooled to room temperature with continuous stirring. Thereafter, without stirring, the autoclave was recharged with 2 moles silicon tetrachloride in 250 ml. of the solvent, hydrogen to bring the autoclave pressure to 150 p.s.i.g. at 4° C. and with ethylene to raise the pressure to 440 p.s.i.g. The autoclave was heated to 200° C. causing the pressure to increase up to 750 p.s.i.g. and then start to decrease in about ½ hour. The temperature was held at 200° C. for five hours while the autoclave was intermittently charged with additional hydrogen and ethylene, in 1:2 molar ratio, to keep the pressure drop averaged at the rate of 100–120 p.s.i.g. per hour. A graph of the temperature plotted against the pressure drop rate indicated that the reaction should be self-sustaining at about 130° C. After being stirred to room temperature overnight (temperature 25° C. and pressure 225 p.s.i.g.), the autoclave was recharged with 1.5 moles hydrogen and 2 moles ethylene, and stirred at 225° C. until the pressure no longer decreased.

After the reaction gases were vented at room temperature, the contents of the autoclave were stirred for one hour with dry powdered sodium chloride at 100–200° C., cooled and filtered anaerobically free of sodium tetrachloroaluminate and aluminum. Hydrolysis of the filtrate did not liberate more than traces of hydrogen or gaseous hydrocarbons, demonstrating that there were no aluminum or silicon hydrides or alkylaluminum compounds present. Solvent and unreacted silicon tetrachloride were stripped off and the resultant clear viscouse red oil was distilled under vacuum to yield 79 g. of a colorless oil boiling below 100° C. at 0.1 mm., and 254 g. undistilled oil.

The first fraction isolated (58 g.) boiling between 27–33° C. at 9 mm., was identified as triethylchlorosilane by boiling point, elemental analysis, and hydrolytic conversion to authentic triethylsilanol (boiling point 154° C., density 0.84 at 20° C., $n_D^{25}$ 1.4298). The remaining 21 g. of volatile product was predominantly a mixture of alkylchlorosilanes, e.g., $Et_xBu_ySiCl_{4-(x+y)}$, wherein $$(x+y)$$

varied between 2 and 4. The undistilled darker oily residue, 254 grams, was a complex mixture of polymeric silanes since both alkaline and acid cleavage reactions which are successful in breaking C—Si bonds in simple alkyl silicon compounds gave only about a seven percent cleavage to hydrocarbons and these contained six or less carbon atoms. Elemental analysis of the residue gave an empirical formula of $C_{15.7}H_{30}Si$, indicative of its polymeric structure.

*Example II*

The first example was repeated exactly, because of material losses and discrepancies in mass balance. Of the 16.1 moles of ethylene charged, 13.9 had been converted to product, and the rest went off as vent gas, while 32 percent of the charged $SiCl_4$ was recovered unchanged. The solvent-free, $NaAlCl_4$-free crude product, 334 g., was free of Si—H, Al—H, and Al—C bonds, but contained some Si—Cl bonds. The crude product was vacuum distilled and six fractions were obtained:

| No. | Boiling Range | Weight Percent of Product | Empirical Formula | Composition |
|---|---|---|---|---|
| 1 | 37°–48.7° at 18.5 mm. | 2.7 | $C_{10}H_{23}Cl_{0.2}$ | Methyl, ethyl, vinylsilances. |
| 2 | 48–50.6 at 18.5 mm. | 5.0 | $C_{8.4}H_{20.2}Si$ | Tetraethylsilane. |
| 3 | 50.6–72.5 at 18.5–9.5 mm. | 9.2 | $C_{10.5}H_{23.4}SiCl_4$ | Alkylchlorosilane mixture. |
| 4 | 72.5–95.5 at 9.5–<0.7 mm. | 8.5 | $C_{15.6}H_{31.6}SiCl_{.2}$ | Alkylenesilane polymer. |
| 5 | 95.1–122.1 at <0.7 mm. | 8.4 | $C_{17.2}H_{34.3}Si$ | Do. |
| 6 | Residue | 66 | $C_{23.7}H_{42.4}Si$ | Do. |

That the products of fractions 4'–6 are polymeric are established by their relative involatilities. Pure tetrahexylsilane, $C_{24}H_{52}Si$, which most closely resembles in empirical formula of the distillation residue, has been reported to boil at 178–9° C. at 5 mm., while the distillation residue was involatile as shown in the table above indicating its polymeric character. The presence of infrared absorption maxima at 8.8 and 9.4 microns, diagnostic of ethylene-disilane bridges, and the low hydrogen to carbon ratios in the saturated products are support that the proposed structure for the polymers is predominantly

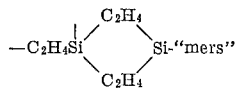

A portion 39.5 g. of the oily dark distillation residue was stirred for 20 minutes with 142 g. dry isopropanol, the alcohol decanted off, the silane product washed twice more with alcohol, dried, at 63° and filtered to give 16.3 g. of clear, light-yellow, alcohol insoluble oil, of empirical formula $C_{19.6}H_{34.6}SiO_{0.1}$ having a determined molecular of 600±30.

*Example III*

To show that the product ratio of simple, volatile silanes to polymeric ethylenedisilacyclohexanes formed could be varied by changing only the ethylene to silicon tetrachloride ratio, Examples I and II were repeated using double the total charge size and $18C_2H_4:4SiCl_4$ molar ratio instead of the approximately 16:2 ratio of Examples I and II. About 95 percent of the ethylene charged was accounted for of which 72 percent was in the product, and similarly 70 percent of the $SiCl_4$ was consumed. The temperature; its nuclear magnetic resonance spectra (both silicon and hydrogen) establish it as a polymer of essentially bridge ethylene structure, i.e.,

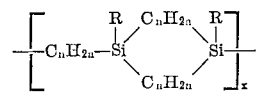

in which about every twentieth R is hydrogen, and about an equal number chlorine atoms, while the rest are alkylene or alkyl radicals. The crude residue has an average molecular weight of about 550, indicating that on an average it is at least a tetramer.

*Examples IV–VIII*

To demonstrate the effects of minor changes on overall yields, the following experiments were run, essentially according to the procedure of Example I.

TABLE I

|  | Example IV | Example V | Example VI | Example VII | Example VIII |
|---|---|---|---|---|---|
| $SiCl_4$ Charged | 170 g. (1 mol) | 170 g. | 170 g. | 170 g. | 340 g. (2 mol). |
| Al Charged | 90 g. (3⅓ mol) | 36 g. (1⅓ mol) | 36 g. | 36 g. | 72 g. (2⅔ mol). |
| $H_2$ Charged | 4 g. (2 mol) | 4 g. | None ($N_2$ instead) | 4 g. | 3 g. (1.5 mol). |
| $C_2H_4$ Charged | 28 g. (1 mol) | 90 g. (3.22 mol) | 123 g. (4.4 mol) | 182 g. (6.5 mol) | 84 g. (3 mol). |
| Solvent ml. charged | 320 ml | 946 ml | 946 ml | 946 ml | 1,000 ml. |
| Activator charged | $HgCl_2$, 1.8 g | $HgCl_2$, 0.4 g. $H_2$ | $HgCl_2$, 0.4 g | $HgCl_2$, 0.4 g. NaCl, 1.33 (1 mol) | $HgCl_2$, $Et_3Al$. |
| Activation | None | 300° C., 3¾ hr | 300° C., 1 hr | 300° C., 1 hr | None. |
| Reaction Time and Temp. | 180° C., 1 hr | 200° C., 3 hr | 200° C., 6 hr | 200° C., 6 hr 300° C., 2 hr | 200° C., 7 hr. |
| $SiCl_4$ recovered | Approx. 90 g | 63 g. (37% charged) | 155 g. (91% charged) | 102 g. (60% charged) | 58 g. (17% charged). |
| Products: |  |  |  |  |  |
| Si | None | 13.6 g. (48.5% $SiCl_4$ charged). | 2.4 g. (8.6% $SiCl_4$ charged). | 7.5 g. (27% $SiCl_4$ charged). | 0.85 (3% $SiCl_4$ charged). |
| $AlCl_3$ | Some | 73.4 g (41.2% Al charged). | Small | 33 g. (18.7% Al charged). | 192 g. (56% Al charged). |
| —C—Al— | None | Equiv. to 21 g. Al (58%). | do | Less than 20 g | None. |
| $C_nH_{2n}$ | Some | Approx. 40 g | Some | Approx. 10 g | Trace. |
| C—Si | Approx. 12 g | Approx. 5 g | Trace | Approx. 9 g | Approx. 290 g. |
| Total Org. Prod | 41.9 g | 136 g | 8 g | 39.3 g | 292 g. | crude product, a dark red oil after removel of solvent and $NaAlCl_4$, weighed 562 g. As expected, the lower $$C_2H_4:SiCl_3$$

ratio used gave a greater amount of volatile products (35 percent as compared to 16 percent) which were a complex mixture having an average empirical formula approximating $C_{9.5}H_{20.4}SiCl_{0.3}$ and comprising methyl, ethyl, butyl, and traces of hexylsilanes with triethyl chlorosilane and tetraethylsilane predominating. More careful fractional distillation of the crude gave the following:

| Fraction | Boiling Point | Weight Percent of Product | Empirical Formula |
|---|---|---|---|
| 1 | Trap contents at 4 mm | 4.4 | $C_{8.6}H_{22.7}SiCl_{0.66}$. |
| 2 | 40–164° C. at 3 mm | 47 | $C_{7.6}H_{17.4}SiCl_{9.75}$. |
| 3 | 158–172 at 0.7 mm | 5.8 | $C_{8.4}H_{17.3}SiCl_{0.38}$. |
| 4 | Residue | 42 | $C_{8.2}H_{15.9}SiCl_{0.1}$. |

All four fractions contained Si—H groups, equivalent to about ten percent of the silicon atoms. The amount of silicon-bound chlorine decreased with the product volatility, varying from about 66 percent of the silicon atoms in the simplest products to about ten percent in the polymeric residue. The crude contained practically no unsaturation and very little carbon-bound chlorine. Fraction 4 was essentially involatile at $10^{-6}$ mm. and room In Examples IV and V, no sodium chloride was used and sublimation of aluminum trichloride made analyses difficult. In Example V, activation occurred in the presence of hydrogen, not ethylene, and the organic aluminum compound formed appeared to be largely ethyldichloroaluminum. In Example VI, nitrogen was substituted for hydrogen and 78 grams sodium chloride were added after the reaction to precipitate sodium tetrachloroaluminate. In Example VII, aluminum was activated in the absence of ethylene and hydrogen and sodium chloride was present initially; this interfered with the reaction appreciably. In Example VIII, sodium chloride was added after the reaction.

Conclusions drawn from the above experiments are (1) mercuric chloride is usable as an activator but less effective than triethylaluminum; (2) activation at 300° C. is not good, but even less effective in the presence of hydrogen; (3) hydrogen must be present to obtain organosilanes; (4) metallic silicon and organoaluminum compounds are produced only at the expense of organic silicon compounds; (5) presence of sodium chloride during the reaction gives poor results except with very vigorous agitation.

*Examples IX–XI*

Following the same procedure of Example I, the effects of changing reactant ratios and other variables were further demonstrated by the experiments shown in the following table.

TABLE II

| Example | IX | X | XI |
|---|---|---|---|
| Moles Charged: | | | |
| Aluminum | 1.33 | 5.34 | 5.33. |
| Silicon Tetrachloride | 2.0 | 2.0 | 4.04. |
| Ethylene | 7.0 | 18.6 | 27.6. |
| Hydrogen | 7.1 | 4.7 | 9.3. |
| Cyclohexane | 9.2 | 9.2 | 18.5. |
| Reaction Conditions: | | | |
| Temperature, °C | 200–205 | 200–205 | 201. |
| Pressure, p.s.i.g | 675–1,075 | 600–1,375 | 550–1,805. |
| Duration, Hours | 11.8 | 14.5 | 16.1. |
| Notes | Low $C_2H_4$:Si, High $H_2$:$CH_4$. | High $C_2H_4$:Si, $C_2H_4$:$H_2$. | All gases charged at one time. |
| Weight Crude Product | 138 | 289 | 490. |
| Percent Weight "Volatile" Product | 34.1 | 16.3 | 19. |
| Percent Weight "Involatile" Product | 65.9 | 83.7 | 81. |
| Empirical Formula "Involatile." | $C_{12.6}H_{25.4}Si$ | $C_{17.4}H_{34.3}Si$ | $C_{17.7}H_{32.6}Si$. |
| Weight $SiCl_4$ Recovered, g | 50 | | 21.4. |

From these experiments it was found that: (a) high $H_2$:$Al_2H_4$, $SiCl_4$:$C_2H_4$ combinations means higher percentage of "volatile" (i.e., below 100° at reduced pressure) products, which are principally the simple alkylsilane compounds; (b) the same higher combinations also yield "involatile products (i.e., the alkylenesilane polymers) having lower carbon to silicon ratios, on an average; and (c) alkylaluminum compounds are formed, as in Example X, only when the $C_2H_4$:$SiCl_4$ and Al:$SiCl_4$ ratios are high.

*Example XII*

To a mixture of 2.54 moles $SiCl_4$, 3.33 moles aluminum, and 0.37 mole technical grade anhydrous aluminum chloride in 1177 g. cyclohexane, previously unheated, was added sufficient hydrogen at 225° C. to give 1000 p.s.i.g. pressure (there was no pressure drop with time). Over 4.5 hours 13.23 moles ethylene was fed, essentially continuously, to the autoclave, and then, at 200° and 1000 p.s.i.g., an additional 11.33 moles ethylene was fed essentially continuously, over five hours. Venting, after completion of the reaction, gave the equivalent of 2.5 moles of ethylene, as ethane and traces of higher hydrocarbons. The reactor was charged with 3.52 moles dry powdered NaCl, held at 200° for one hour, cooled, and discharged. Filtration and stripping of the filtrate gave 615 g. crude product, of average empirical formula $C_{15.2}H_{32.9}SiCl_{1.24}$, thus accounting for 93 percent of the silicon charged. An addition of two percent of the silicon charged was found in the product, of about the same empirical formula, obtained on extracting the insoluble reactor solids that were removed by filtration.

The "volatile" portion of the product (volatile at 150° C. and 10 mm.) was 63 percent of the total product weight. This shows that, even with a high $C_2H_4$:Si ratio, a large proportion of the simple alkylsilicon compounds can be obtained, solely by maintaining a constant, high head of hydrogen on the reactor. It also shows that time-consuming and expensive preactivation of the aluminum is unnecessary. The most volatile products were mixtures of ethylchlorosilanes with some methylsilicon compounds. A second distillation cut, 43 percent of the total product weight, analyzed properly as a mixture of about ⅔ tetraethylsilane and ⅓ butyldiethylchlorosilane. A fraction, boiling in the range 57–61° at 20 mm. to 0.2 mm., that represented 16.5 percent of the product weight, had an empirical formula of $C_{28.8}H_{59}Si$, while the distillation residue, involatile below 10° C. and 0.1 mm., and representing 24 percent of the product weight, had an empirical formula of $C_{30.6}H_{55}Si$. All fractions were free of silicon hydrides and carbon-carbon unsaturation. The less volatile fractions, by infra-red, were successively richer in ethylenedisilane bridging, and in higher alkyl groups.

These facts, and the very low hydrogen to carbon ratio of the residue support the postulated "mer" structure as

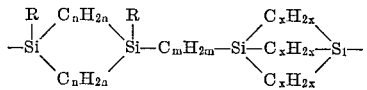

where $n$, $m$ and $x$ are small, even-numbered integers, and the length of the alkyl groups R are such that there is an average of about 31 carbon atoms per silicon atom.

*Example XIII*

This experiment was run to show that cyclic unsaturated hydrocarbons having non-aromatic unsaturation could be used in accordance with the present invention. Following the procedure of Example I, 72 grams of aluminum were activated as a suspension in 596 grams cyclohexane. Then 342.5 g. silicon tetrachloride in 329 ml. of cyclohexene and 3.78 moles hydrogen were added and the mixture heated to 200° C. for 6.2 hours. After venting the volatile gases, the mixture was heated with 58.5 g. sodium chloride to precipitate sodium tetrachloroaluminate. The solid filtration residues contained no silicon compounds. From the filtrate 219 g. silicon tetrachloride (64 percent of that charged) were recovered. The residue of distilled filtrate 540 g. of brown oil involatile at 5 mm. and 171° C. pot temperature, consisted of mixed silylcyclohexene polymer and $[H(C_6H_{12})_n]_mSiCl_{4-m}$; wherein $n$ and $m$ appear to be two, predominantly. Of the liquid volatile at 5 mm. and 171° C., the organohalosilicon compounds are believed to be chiefly of the type wherein $n$ is equal to 1 and $m$ is equal to 2–3, for example, dicyclohexyldichlorosilane.

*Example XIV*

Since cyclic saturated hydrocarbons, e.g., cyclohexane, and branched acyclic alkanes, e.g., 2,3-dimethylbutane, are known to be converted at least momentarily, to olefins on being heated with Lewis acids, e.g., aluminum alkyls and $SiCl_4$, an experiment was run to show that "nascent" olefins could be used in this reaction. Following the general procedure of Example I, a mixture of 2.67 moles Al, 0.24 mole $(C_2H_5)_3Al$, and 2.08 moles $SiCl_4$ in 9.14 moles cyclohexane was pressured to 720 p.s.i.g. with hydrogen, then held at 200° C. for 3 hours and at 225° for 20 hours. From the reaction filtrate, very little $SiCl_4$ was recovered, but about 90 percent of the cyclohexane was recovered unchanged. Distillation of the filtrate left as residue some 41 g. of alkylene chlorosilane polymer; an additional 20 g. was obtained by heating the voluminous filtration residue with anhydrous sodium chloride, refitting, and distilling this filtrate. This yield of product, of empirical formula $C_{11}H_{24.1}SiCl_{1.4}O_{.63}$ was too great to have come from the triethylaluminum alone, and therefore at least an equal amount of cyclohexane must have been converted, via nascent olefins, to alkylenesilane polymer.

Example XV

This experiment was run to prove that the Ziegler mechanism is inoperative in our reaction. Following the procedure in Example I, 36 grams aluminum and 11.5 grams triethylaluminum in 750 cc. cyclohexane, were heated at 200° C. for one hour, then cooled to room temperature. Then 170 g. silicon tetrachloride, 1.0 mole titanium tetrachloride were added, and the mixture reacted with a total of 4.77 moles ethylene and 2.02 moles hydrogen at 200° C. over a period of 12.7 hours. At least 80 percent of the silicon tetrachloride was recovered unchanged and silicon-free, hydrocarbon polymer of molecular weight 162,500, softening at 120–35° C., was obtained. It had infrared characteristics of almost completely saturated polyethylene. This confirms McFarland, U.S. 2,920,062, claiming silicon tetrachloride as solvent for Ziegler polymerization of ethylene. No alkylchlorosilanes were formed, not even those of high molecular weight.

Example XVI

Attempted substitution of other metals for aluminum were unsuccessful. Following the procedure in Example I, 24.3 g. of clean, dry magnesium powder (70–80 mesh) was activated with 0.65 mole of triethylaluminum in 750 cc. cyclohexane under nitrogen atmosphere at 100° C. for one hour. Then 170 cc. silicon tetrachloride in 250 cc. cyclohexane and 123 cc. propene and 3 g. hydrogen were added and the mixture was heated at 200° C. for five hours. After filtration, the magnesium was almost entirely recovered except for traces of magnesium chloride. The filtrate contained almost all the silicon tetrachloride charged. The cyclohexane was quantitatively recovered; about 18 g. of silicon-free polyethylene was recovered as a brown oil; and no organosilicon compounds were obtained.

Example XVII

This example shows the resistance of organohalosilanes to tetraalkylation. Following the procedure in Example I, 109 g. trimethylchlorosilane, 27 g. activated aluminum, and 1000 ml. cyclohexane were mixed in the autoclave and then reacted with approximately 1.88 moles hydrogen and 3.88 moles ethylene at 200° C. for 5¾ hr. Most of the aluminum and trimethylchlorosilane (107 g. out of 109 g.) were recovered unchanged, but the distillation residue, 24 g. contained a polymeric residue as a dark thick oil. The general lack of reactivity of the fourth chloride illustrates a basic difference between our novel reaction and that of Jenkner, U.S. 3,027,393.

Example XVIII

Following the procedure in Example I, 27 g. of aluminum in 657 ml. cyclohexane was activated at 200° C. with triethylaluminum for one hour. Then 136 g. trichlorosilane, one g. hydrogen, 225 g. vinyl fluoride and 270 ml. cyclohexane were added and reacted at 200° C. The major products recovered were silicon tetrafluoride and vinyl chloride, according to the reaction:

$$SiHCl_3 + 4CH_2=CHF \rightarrow SiF_4 + C_2H_4 + 3CH_2:CHCl$$

However, 20 g. of brown oil obtained on distillation of the reaction filtrate were shown to contain $$[H(C_2H_4)_n]_mSiCl_{4-m}$$

which could possibly have arisen from the reactions:

(a)
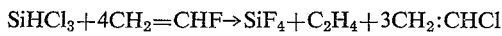
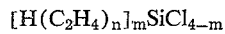

(b)
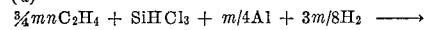
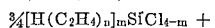
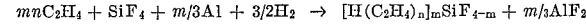
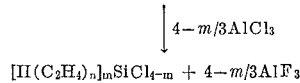

Example XIX

Following the procedure in Example I, 72 g. of aluminum was activated with 3.6 g. triethylaluminum in 1000 cc. cyclohexane at 200° C. for one hour, and then reacted with 177 g. silicon tetrafluoride, 8 g. hydrogen and 112 g. ethylene at 200–300° C. for a period of 15.7 hours. A higher temperature and longer time than in the prior examples was used because of the known inertness of silicon tetrafluoride as compared to silicon tetrachloride. A major reaction here was

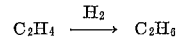

Because of the inertness of silicon tetrafluoride, most of the aluminum was recovered unchanged, although some of the desired reaction occurred. Of the desired reaction products, ethyltrifluorosilane, boiling point 4° C., escaped in the vented gases and was trapped in the water of a scrubber tower as the incompletely hydrolyzed mixed polyethylfluorosiloxane. The next less volatile product, diethyldifluorosilane, formed in much smaller yield, boiling point 61° C., distilled as forerun of the cyclohexane distillate, boiling point 68–72° C. There was no evidence for the formation of triethylfluorosilane in either the cyclohexane distillate or the distillation residue, boiling above 80° C. at 750 mm. However, the 88 g. of residue, largely alpha-olefins, is believed on the bases of urea clathrate experiments to contain some dialkyldifluorosilanes. Since the cyclohexane forerun contained, by vapor phase chromatography, minor quantities of several products less volatile than diethyldifluorosilane, it is believed that butyl trifluorosilane had also been formed.

Example XX

This experiment was performed to show that just as the mixture of silicon tetrachloride and silicon tetrafluoride might undergo reaction to give a less alkylated silane mixture than silicon tetrachloride alone, but more efficiently than silicon tetrafluoride alone, so mixed tetraalkoxysilanes and silicon tetrachloride should react according to the equation:

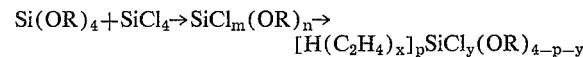

wherein $m+n$ is equal to 4 and $p$ has, on an average, a smaller value than that obtained from silicon tetrachloride, alone under the same conditions.

Following the procedure of Example I, 72 g. of aluminum in 736 ml. cyclohexane was activated with 3.6 g. triethylaluminum at 200° C. for 30 minutes. After cooling the autoclave, the mixture was treated with 170 g. silicon tetrachloride, 208 g. tetraethoxysilane (1 mole each to 2.6 moles aluminum), and then 6.6 g. hydrogen and 92.4 g. ethylene (3.3 moles each). The mixture was heated, with stirring, to 200° C. After 35–40 minutes at 200° C., an exothermic reaction raised the temperature to 320° C. in five minutes. The reactants were quickly cooled back to 200° C. and held there for five hours. Then the gases were vented, 156 g. sodium chloride and an additional 736 ml. of cyclohexane were added, and the mixture reheated to 200° C. for one hour. The mixture was cooled and filtered under nitrogen giving 560 g. dark green solids and approximately 620 g. of filtrate and washings. The solids, more voluminous than in other examples, were identified as a complex mixture containing aluminum trichloride, triethoxyaluminum and involatile organic silicon derivatives that are believed to contain

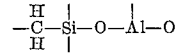

residues. Approximately 20 percent of the solids appear to be organic predominantly $(C_{2-4}H_{5-9})_{12}$—Si—O polymers, as well as tightly bound ethoxy groups. The filtrate on the other hand contained no ethoxy groups; all the liquid organic silanes formed were chlorosilanes, and not ethoxy silanes. The solvent-stripped filtrate, 106 g., shown by clathration tests to be free of n-hydrocarbons of 8 or more carbon atoms, had elemental analysis suggesting average linear formula approximating $(C_9H_{19})_3SiCl$

*Example XXI*

Flow system reaction. In several trials, passage of mixtures of known amounts of silicon tetrachloride, ethylene and hydrogen over activated aluminum or magnesium in a horizontal or vertical tube reactors at 300–500° C. and atmospheric pressures gave no organosilane compounds, although at higher (400–500° C.) temperatures, the reaction:

$Mg+H_2+SiCl_4 \rightarrow MgCl_2+SiHCl_3$ occurred to a small extent. The use of ultraviolet irradiation, and platinum catalysts, had no effect. At slightly superatmospheric pressure, totaling less than eight atmospheres, prolonged (9–15 seconds) residence times over aluminum at 400° C. gave, in single passes, up to 5 percent conversions of silicon tetrachloride to predominantly $(C_2H_5)_{1-2}SiCl_{3-2}$.

*Example XXII*

The purpose of this experiment was to show that halides of Group IVA metals other than silicon were useful in our method. Following the procedure in Example I, 18.1 g. of aluminum, 1 g. triethylaluminum, and 1000 ml. cyclohexane were heated one hour at 200°. The autoclave was then charged cold with 157.7 g. stannous fluoride, 112 g. ethylene and 8 g. hydrogen and heated to 200–300° C. for 5.5 hours. From this reaction 708 g. filtrate, 172 g. filtration residue (wet), and about 80 g. semi-solids scraped off the autoclave walls were recovered. The filtrate was solvent-stripped and was found to contain no organotin compound boiling below 150 °C. In the successively higher boiling fraction, e.g., (a) 19.5 grams boiling up to 30° C. at 0.5 mm. pressure, (b) 8.9 g. boiling between 30–50° C. at 5 mm., and (c) the 34.5 g. involatile under those conditions, contained tetraalkylstannane as shown by elemental analysis and bromine addition. The use of lower valence stannous fluoride at higher temperatures, has therefore been conducive to complete alkylation to e.g., $[H(C_2H_4)_{1-4}]_4Sn$. In addition, incompletely alkylated fluorostannanes, e.g., $(C_4H_9)_2SnF_2$, were also formed. The distillation residue was believed to contain a relatively minor amount of ethylenedistannane polymers.

*Example XXIII*

Following the procedure of Example I with the exception that lead dichloride was substituted for silicon tetrachloride, gave as the major reaction:

$3PbCl_2+2Al \rightarrow 2AlCl_3+3Pb$

There were also obtained mixtures of $[H(C_2H_4)_{1-3}]PbCl_{3-1}$ with $Et_{2-3}PbCl_{2-1}$ predominating. The ease of acid (e.g., $AlCl_3$) cleavage of lead-carbon bonds makes any formation of organic lead compounds surprising for this reaction.

*Example XXIV*

Clathration to test for, and remove, paraffin hydrocarbons from silane products. Since paraffinic hydrocarbons such as polyethylene wax are known to form solvent insoluble urea and thiourea clathrates (Petroleum Refiner 31, No. 3, p. 106, March 1952), while we have found that neither our novel silane polymers nor alkylsilanes do, a clathrate separation test was run routinely on the silicon-containing products to prove that they were hydrocarbon-free. In accordance with this test, to 25 ml. of a solution of 5 g. urea (or thiourea) in refluxing methanol, was added 1 g. of product, followed when necessary, by just enough isopropyl alcohol or butyl ether to effect solution. On cooling to room temperature overnight (occasionally with seeding), the urea-hydrocarbon clathrate precipitated. Ether, 100 ml. was added, the clathrate was filtered, washed, and dried, and the combined filtrate and washings evaporated to recover the silane product. First tests indicated that this procedure gave no urea clathrates with octadecyltrichlorosilane, octadecyltrimethylsilane, or octadicyltrimethoxysilane; the thiourea underwent a side reaction with a chlorosilane compound but gave no clathrates. This procedure gave a quantitative separation of a 50–50 (weight) mixture of n-octadecane and n-octadecyltrichlorosilane. No clathrates could be isolated from any of the silane product tested.

*Example XXV*

The silane polymer of Example I was converted to a novel, useful lubricant by the following procedure: 48 g. of the distillation residue, dissolved in 32.3 g. phosphorus trichloride, was treated for 2.5 hours at 60° C. with a stream of oxygen, then the viscous solution was blown free of oxygen and HCl by dry nitrogen. A filtered solution in 100 ml. dry toluene was distilled, the brown liquid distillation residue, involatile at 114° C. and 742 mm., was taken as the crude phosphonyldichloride. To it, at 30–36° C., was added in one hour, a mixture of 80.9 g. 2-ethylhexanol and 52.3 g. pyridine. An additional 100 ml. of the alcohol and 150 ml. of the base were added. The brown mixture was stirred at 129° C. for 16 hours, then cooled and filtered free of pyridine hydrochloride. The water-washed and dried filtrate gave as the distillation residue, involatile at 103° and 0.5 mm. 49 g. of oil, the crude bis-2-ethylhexyl phosphonate.

The crude phosponate showed promise, in first screening tests as a potential flame-proof lubricant. In addition to being non-combustible, it had a pourpoint of −25° C., no readily attainable flash point, and a viscosity coefficient of 0.88.

*Example XXVI*

Depending on the purpose to which products will be put, different types of cleanups will be necessary. The distillation residue of Example III, of empirical formula $C_{8.2}H_6SiCl_{0.4}$ and molecular weight around 500, was slowly added to an excess of concentrated sulfuric acid and stirred at ambient temperature for six hours. The upper, tacky, dark layer, smelling of $SO_2$ and HCl, was decanted and washed well with water, giving as a dried product an opaque white gum containing loosely bound sulfate. Treatment of the paste in dioxane with caustic soda solution (five percent) gave a 90 percent yield of dioxane-soluble product, a dark tar of empirical formula $C_{7.8}H_{15}SiCl_{0.2}$ and molecular weight 888.

Variations on this procedure are useful for making new silicone gums and rubbers. A solution of 1 g. of crude product in the original cyclohexane, before treatment with sodium chloride, was mixed anaerobically with 3 ml. dimethyldichlorosilane, and the mixture added dropwise, with vigorous stirring, to three times its volume of concentrated sulfuric acid at 10–20° C. After six hours of agitation to and at room temperature, the contents of the flask were evaporated free of cyclohexane and decanted free of the dark acid layer by water washing. The tacky white gum that resulted was converted to a silicone semisolid by treatment with caustic.

*Example XXVII*

The crude product of an aluminum-ethylene-hydrogen-silicon tetrachloride reaction, a viscous brown oil containing predominantly disilacycloalkylene polymers of the general formula

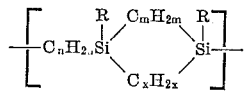

where the R's are simple hydrocarbon residues such that the total carbon content, including the $n$, $m$ and $x$, averages about 8 carbon atoms for each silicon atom, was added to an equal weight (32.3 g.) of maleic anhydride and held in the presence of t-butyl peroxide at 169–173° C. for 7½ hours. High vacuum distillation removed among other compounds 19.9 g. unreacted anhydride, leaving, as a thick, dark brown residue, a mixture of desired polymeric adducts, the bulk of which were chloroform soluble but hexane and benzene insoluble (the starting alkylenesilane polymer was hexane soluble). The major fraction of the product mixture, 16.1 g. of clear, dark brown viscous liquid, had a saponification equivalent of 331, suggesting that each two "mers" of the structure shown have been substituted by an average of approximately one succinic anhydride unit (theoretical for a $C_{36}H_{61}Si_4O_4$ dicarboxylic acid, 334.5). The sodium salts are more soluble in alcohol than in aqueous alkali.

Di- and trialkyltin halides and oxides, e.g., tributyltin oxide, are commercially important preservatives and biocides. Such compounds can readily be made by heating, e.g. tetrabutylstannane with the proper amount of a stannic halide. The higher tetraalkylstannanes, e.g., tetraoctyltin, are useful scavenger-stabilizers and secondary plasticizers for halogenated polymers, chiefly vinyl chloride. Use of trialkyltin halides directly for this purpose is not generally effective, but "fixing" the trialkyltin residue in the polymer, either by metathesis or addition of the corresponding tin hydride to a double bond in the polymer greatly increases stability. Dialkyl derivatives of both tin and germanium have been shown, largely by government-sponsored studies, to form thermally stable polymers. The higher lead alkyls are useful sources of free radicals. Their undesirable physiological properties have also suggested their use in special pharmacological studies.

We claim:

1. A method of making a mixture of monomeric and polymeric organometallic compounds, wherein
    (a) said monomeric compounds have the formula $$R_rR'_{p-1}MX_{5-(r+p)}$$

wherein R is alkyl having 2–12 carbon atoms, R' is a member selected from the group consisting of R, phenyl and hydrogen, M is a metal of Group IVA of the Periodic Table having an atomic number of 14–82 inclusive, X is a halogen, $r$ is an integer having a value of 1–3, $p$ is an integer having a value of 1–2, and the values of $r$ and $p$ being such that their sum is equal to 2–5, and
    (b) said polymeric compounds have the formula:

wherein R' and M are as defined above; each $C_nH_{2n}$ moiety directly bridges two metal atoms, $y$ and $z$ indicating the number of such independent bridges; $n$ is an integer having one of the values 2 and 4; $x$ is an integer having a value of 2–10, and $y$ is an integer having a value of 2–3, and $z$ is an integer having a value of 1–2, such that the sum of $y$ plus $z$ is not greater than four, comprising reacting under anhydrous oxygen-free conditions a compound of the formula $R'_{p-1}MX_{m+1-p}$ wherein R', M, X and $p$ are defined as above and $m$ the valence of said metal, with a hydrocarbon having 2–12 carbon atoms and containing sterically unhindered, non-aromatic unsaturation, aluminum, and hydrogen, at a temperature of 150–450° C. and under superatmospheric pressure.

2. A method according to claim 1, wherein said mixture of monomeric and polymeric organimetallic compounds is separated by fractional distillation.

3. Method according to claim 2 wherein the mole ratios of reactants are 0.2–10 moles of aluminum to 1–100 moles of olefin to 1–100 moles hydrogen to 1 mole of silicon halide.

4. Method of making an organosilane of the formula:

$$R_rSiX_{4-r}$$

wherein R is alkyl having from 2–12 carbon atoms, X is a halogen, and $r$ is an integer having a value of 1–4, comprising reacting under anhydrous oxygen-free conditions a mixture consisting of a silicon tetrahalide and a tetralower alkyl silicate in molar ratio of no less than 1:1, with a sterically unhindered olefin having from 2–12 carbon atoms, aluminum, and hydrogen at a temperature of 150–450° C. under superatmospheric pressure and separating off said organosilanes.

5. Method of making an organosilane of the formula:

$$R_rSiX_{4-r}$$

wherein R is alkyl having from 2–12 carbon atoms, X is a halogen, and $r$ is an integer having a value of 1–4, comprising reacting under anhydrous oxygen-free conditions a mixture consisting of a silicon tetrahalide and silica in a molar ratio of no less than 1:1, with a sterically unhindered olefin having from 2–12 carbon atoms, aluminum, and hydrogen at a temperature of 150–450° C. under superatmospheric pressure and separating off said organosilane.

6. A method of making organometallic compounds of the formula:

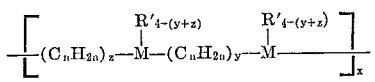

wherein R' is a member selected from the group consisting of alkyl having from 2–12 carbon atoms, phenyl, and hydrogen, M is a metal of Group IVA of the Periodic Table having an atomic number of 14–82 inclusive, each $C_nH_{2n}$ moiety directly bridges two metal atoms, $y$ and $z$ indicating the number of such independent bridges, $n$ is an integer having one of the values 2 and 4, $x$ is an integer having a value of 2–10, and $y$ is an integer having a value of 2–3, and $z$ is an integer having a value of 1–2, such that the sum of $y$ plus $z$ is not greater than four, comprising reacting under anhydrous oxygen-free conditions a compound of the formula $R'_{p-1}MX_{m+1-p}$ wherein R' and M are defined as above, X is halogen, $p$ is an integer having a value of 1–2, and $m$ is the valence of said metal, with a hydrocarbon having 2–12 carbon atoms and containing sterically unhindered, non-aromatic unsaturation, aluminum, and hydrogen at a temperature of 150–450° C. under superatmospheric pressure and separating off said organometallic compounds.

7. A method of making organometallic compounds of the formula:

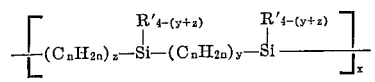

wherein R' is a member selected from the group consisting of alkyl having from 2–12 carbon atoms, phenyl, and hydrogen, each $C_nH_{2n}$ moiety directly bridges two metal atoms, $y$ and $z$ indicaitng the number of such independent bridges, $n$ is an integer having one of the values 2 and 4, $x$ is an integer having a value of 2–10, and $y$ is an integer having a value of 2–3, and $z$ is an integer having a value of 1–2, such that the sum of $y$ plus $z$ is not greater than four, comprising reacting under anhydrous oxygen-free conditions a compound of the formula $R'_{p-1}SiX_{5-p}$ wherein R' is defined as above, X is halogen and $p$ is an integer having a value of 1–2, with a hydrocarbon having 2–12 carbon atoms and containing sterically unhindered, non-aromatic unsaturation, aluminum, and hydrogen at a temperature of 150–450° C. under superatmospheric pressure and separating off said organometallic compounds.

8. A method of making organometallic compounds of the formula:

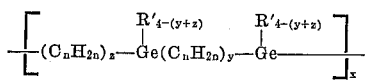

wherein R' is a member selected from the group consisting of alkyl having from 2–12 carbon atoms, phenyl, and hydrogen, each $C_nH_{2n}$ moiety directly bridges two metal atoms, y and z indicating the number of such independent bridges, n is an integer having one of the values 2 and 4, x is an integer having a value of 2–10, and y is an integer having a value of 2–3, and z is an integer having a value of 1–2, such that the sum of y plus z is not greater than four, comprising reacting under anhydrous oxygen-free conditions a compound of the formula $R'_{p-1}GeX_{m+1-p}$ wherein R' is defined as above, X is halogen, p is an integer having a value of 1–2, and m is the valence of germanium, with a hydrocarbon having 2–12 carbon atoms and containing sterically unhindered, non-aromatic unsaturation, aluminum, and hydrogen at a temperature of 150–450° C. under superatmospheric pressure and separating off said organometallic compound.

9. A method of making organometallic compounds of the formula:

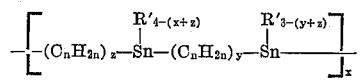

wherein R' is a member selected from the group consisting of alkyl having from 2–12 carbon atoms, phenyl, and hydrogen, each $C_nH_{2n}$ moiety directly bridges two metal atoms, y and z indicating the number of such independent bridges, n is an integer having one of the values 2 and 4, x is an integer having a value of 2–10, and y is an integer having a value of 2–3, and z is an integer having a value of 1–2, such that the sum of y plus z is not greater than four, comprising reacting under anhydrous oxygen-free conditions a compound of the formula $R'_{p-1}SnX_{m+1-p}$ wherein R' is defined as above, X is halogen, p is an integer having a value of 1–2, and m is the valence of tin, with a hydrocarbon having 2–12 carbon atoms and containing sterically unhindered, non-aromatic unsaturation, aluminum, and hydrogen at a temperature of 150–450° C. under superatmospheric pressure and separating off said organometallic compounds.

10. A method of making organometallic compounds of the formula:

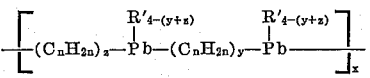

wherein R' is a member selected from the group consisting of alkyl having from 2–12 carbon atoms, phenyl, and hydrogen, each $C_nH_{2n}$ moiety directly bridges two metal atoms, y and z indicating the number of such independent bridges, n is an integer having one of the values 2 and 4, x is an integer having a value of 2–10, and y is an integer having a value of 2–3, and z is an integer having a value of 1–2, such that the sum of y plus z is not greater than four, comprising reacting under anhydrous oxygen-free conditions a compound of the formula $R'_{p-1}PbX_{m+1-p}$ wherein R' is defined as above, X is halogen, p is an integer having a value of 1–2, and m is the valence of lead, with a hydrocarbon having 2–12 carbon atoms and containing sterically unhindered, non-aromatic unsaturation, aluminum, and hydrogen at a temperature of 150–450° C. under superatmospheric pressure and separating off said organometallic compound.

11. An organometallic compound having the formula:

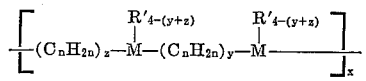

wherein R' is a member selected from the group consisting of alkyl having 2–12 carbon atoms, phenyl, and hydrogen; M is a metal selected from Group IVA of the Periodic Table having an atomic number of 14–82 inclusive each $C_nH_{2n}$ moiety directly bridges two metal atoms, y and z indicating the number of such independent bridges; and n is an integer having one of the values 2 and 4, x is an integer having a value of 2-10, y is an integer having a value of 2–3, and z is an integer having a value of 1–2, such that the sum of y plus z is not greater than four.

12. An organosilicon compound having the formula:

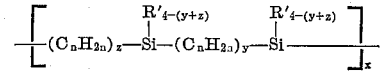

wherein R' is a member selected from the group consisting of alkyl having 2–12 carbon atoms phenyl, and hydrogen, each $C_nH_{2n}$ moiety directly bridges two metal atoms, y and z indicating the number of such independent bridges, n is an integer having a value of 2 and 4, x is an integer having a value of 2–10, y is an integer having a value of 2–3, and z is an integer having a value of 1–2, such that sum of y plus z is not greater than four.

References Cited by the Examiner

UNITED STATES PATENTS

| | | | |
|---|---|---|---|
| 2,897,220 | 7/1959 | Jenkner | 260—448.2 |
| 3,032,574 | 5/1962 | Zeigler | 260—448 |
| 3,061,647 | 10/1962 | Jenkner | 260—429.9 X |
| 3,103,526 | 9/1963 | Jenkner | 260—429 X |

OTHER REFERENCES

Coates, G. E.: Organo-Metallic Compounds, John Wiley & Sons, Inc., New York, N.Y. (1960), page 129.

Zeiss, H., ed.: Organometallic Chemistry, Reinhold Publishing Corporation, New York, N.Y. (1960), pages 245–7.

TOBIAS E. LEVOW, *Primary Examiner.*

T. L. IAPALUCCI, A. P. DEMERS, *Assistant Examiners.*